United States Patent
Takehashi

[11] Patent Number: 5,368,093
[45] Date of Patent: Nov. 29, 1994

[54] THAWING DEVICE FOR FROZEN FOODS

[75] Inventor: Takeshige Takehashi, Toyama, Japan

[73] Assignee: Sanwa Life Cela Kabushiki Kaisha, Toyama, Japan

[21] Appl. No.: 981,789

[22] Filed: Nov. 25, 1992

[51] Int. Cl.$^5$ .............................................. A23B 7/045
[52] U.S. Cl. ................................. 165/46; 165/104.19; 126/400; 426/524; 99/483
[58] Field of Search ...................... 126/204, 910, 400; 426/524; 99/483; 165/46, 104.19

[56] References Cited

U.S. PATENT DOCUMENTS 4,421,101 12/1983 Stice ........................................ 126/910
4,777,930 10/1988 Hartz ........................................ 126/400

FOREIGN PATENT DOCUMENTS 64-60361 3/1989 Japan .
2025030 1/1980 United Kingdom ................ 126/910

*Primary Examiner*—Albert W. Davis, Jr.
*Attorney, Agent, or Firm*—Flynn, Thiel, Boutell & Tanis

[57] ABSTRACT

A thawing device for frozen foods comprise a flexible bag-shaped body and a thermal transfer fluid hermetically filled in the bag-shaped body, wherein the thermal transfer fluid comprising a mixture of fine particles of hard carbon or graphitic carbon and water. The thawing device has a flexibility, hence it can closely contact the frozen foods even if the frozen foods have complicated shapes. Furthermore, it is possible to enhance the thawing efficiently by double folding the thawing device to wrap the frozen foods. Still furthermore, the thawing device has an excellent wettability, hence it can closely contact the frozen foods.

14 Claims, 3 Drawing Sheets

THAWING DEVICE FOR FROZEN FOODS

BACKGROUND OF THE INVENTION

1. Field of the Invention

The present invention relates to a thawing device frozen foods such as loin, fish, etc.

2. Prior Art

Frozen foods have been conventionally immersed into water or heated by a microwave oven for reducing time involved in thawing the frozen foods since it has taken much time to thaw the frozen foods under the normal temperature, which leads to vanishment of taste and remarkable deterioration of quality and freshness. Accordingly, there has been employed a thawing device having an excellent thermal conductivity, wherein the frozen foods contact the thawing device to thereby perform a heat exchange between the thawing device and the frozen foods.

Such a thawing device is disclosed in Japanese Patent Laid-Open Publication No. 64-60361 wherein the thawing device is formed of a solid plate body comprising a graphite compound of various artificial graphite, natural graphite, thermal cracking graphite. The frozen foods are put on or held between the thawing device.

In view of an excellent thermal conductivity of the conventional thawing device, the thawing device influences its self heat or ambient heat to the frozen foods to thereby thaw the frozen foods when the frozen foods contact the thawing device. However, an intended thawing efficiency can not be attained.

This poor thawing efficiency comes from the fact that firstly, the thawing device is formed of a rigid plate, secondly, the frozen food is modified in the shape thereof and indefinite at the surface thereof. Particularly, at the first stage of the thawing of the frozen food, the frozen food is rigid and firm, hence there occurs a poor contact between the thawing device and the frozen food, whereby voids, which impedes the thermal conductivity, is formed between the thawing device and the frozen food.

SUMMARY OF THE INVENTION

In view of the circumstances set forth above, the present invention has been made to provide a thawing device for frozen foods capable of efficiently thawing the frozen foods because of an excellent contact between the thawing device and the frozen foods.

To achieve the above object, a thawing device for frozen foods according to a first aspect of the present invention comprises a flexible bag-shaped body and a thermal transfer fluid hermetically filled in the bag-shaped body, wherein the thermal transfer fluid comprising a mixture of fine particles of hard carbon or graphitic carbon and water.

A thawing device for frozen foods according to a second aspect of the present invention comprises a plate-shaped body composed of fine particles of hard carbon or graphitic carbon which is hardened by a binder so as to be formed in a given shape and is subjected to heat treatment so as to be formed in a given plate-shape wherein the surface of the plate-shaped body has an excellent hydrophilic property.

In the thawing device as disclosed in Japanese Patent Laid-Open Publication No. 64-60361, since the surface of the thawing device has a porous and uneven surface, drip generated when the frozen foods are thawed soaks into the thawing device through the surface of the thawing device to thereby causes smell and mold, which leads to a drawback to the using of the thawing device.

A thawing device for frozen foods according to a third aspect of the present invention comprises a combination of a flexible bag-shaped body and a thermal transfer fluid hermetically filled in the bag-shaped body, wherein the thermal transfer fluid comprising a mixture of fine particles of hard carbon or graphitic carbon and water and a plate-shaped body composed of fine particles of hard carbon or graphitic carbon which is hardened by a binder so as to be formed in a given shape and is subjected to heat treatment so as to be formed in a given plate-shape wherein the surface of the plate-shaped body has an excellent hydrophilic property.

Preferably, the fine particles have a size of 1 to 1000 $\mu$m, more preferably from 100 to 500 $\mu$m.

Moreover, it is preferred that the fluid should further comprise a surface active agent, sodium chloride and small amounts of bactericides and preservatives.

DESCRIPTION OF THE PREFERRED EMBODIMENT

Figure 1:
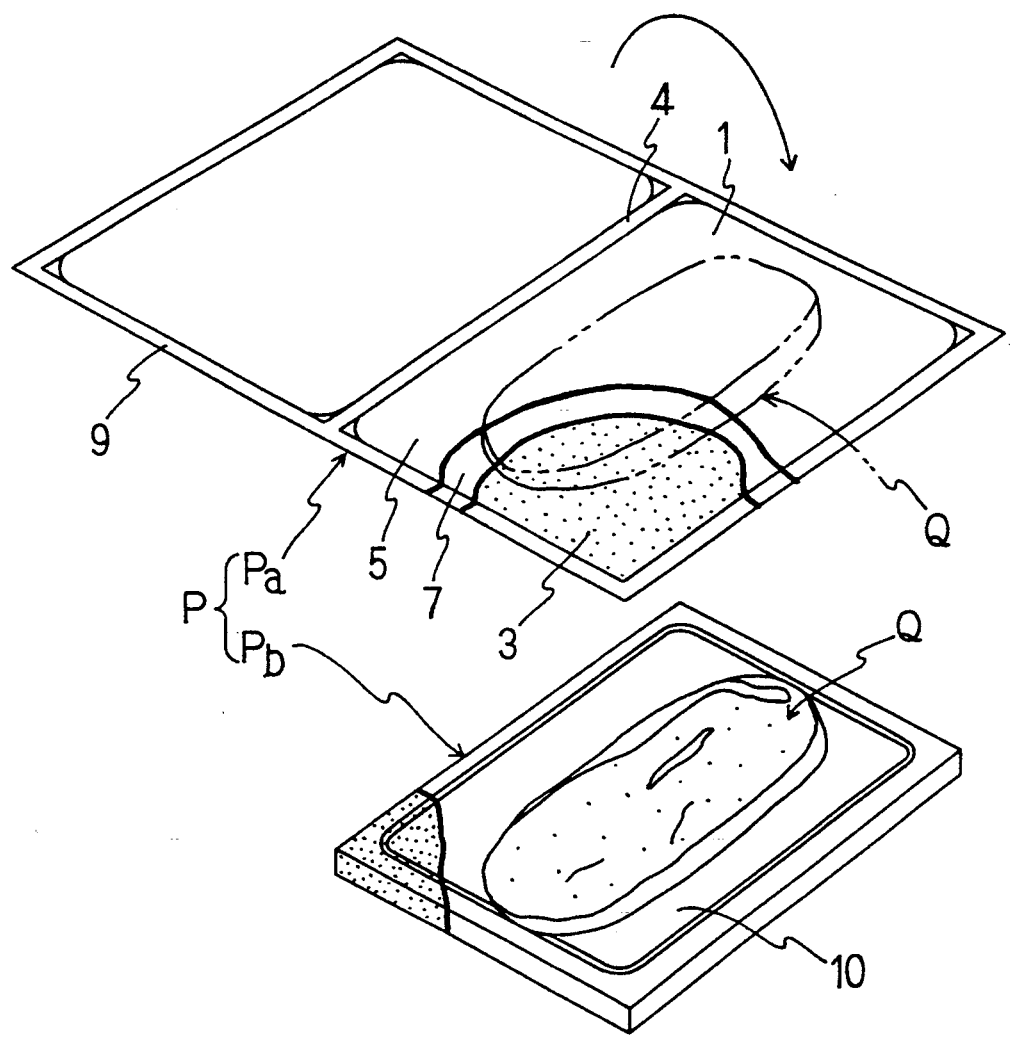
FIG. 1 is perspective views showing a bag-shaped thawing device and a plate-shaped thawing device according to first to third embodiments of the present invention wherein parts of which are cut away.
Figure 2:
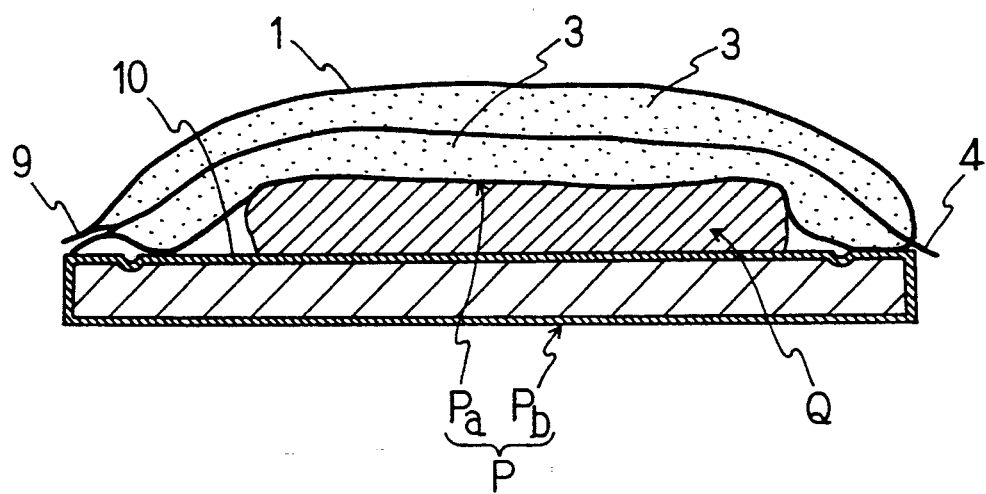
FIG. 2 is a cross-sectional view explaining an example of use of the thawing device in FIG. 1.

FIGS. 1 and 2 show a generic embodiment forming first to third embodiments of the present invention wherein a thawing device P of the third embodiment comprises a combination of a bag-shaped thawing device Pa of the first embodiment and a plate-shaped thawing device Pb of the second embodiment. That is, both of the bag-shaped thawing device Pa and the plate-shaped thawing device Pb can be used independently of each other. Furthermore, they can be used as a combination thereof by putting a frozen food Q therebetween.

The bag-shaped thawing device Pa comprises a bag-shaped body 1 and a thermal transfer fluid 3 having an excellent thermal conductivity wherein the former is filled with the latter and the former is hermetically sealed. The thawing device Pa has a hinge portion 4 at the central portion in the width direction thereof so that it can be double-folded and the frozen food Q can be put therebetween (refer to the arrow and two dotted one chain line in FIG. 1).

The bag-shaped body 1 may be made of a flexible composite film, which includes a laminate of a nylon outer film 5 which feels good to the touch and a firm polyester inner film 11. Aside from the laminate film, a nylon sheet of a single layer can be used effectively. The bag-shaped body 1 is subjected to a heat fusing at the periphery and the central portion in the width direction thereof while the thermal transfer fluid 3 is filled therein, whereby a heat fused flange edge 9 is provided at the periphery thereof and the hinge portion 4 is provided at the central portion in the width direction thereof. For hermetically sealing, the thermal transfer fluid 3 is filled up in the bag-shaped body 1, followed by heat sealing under vacuumizing condition. By this, the phase separation and spoilage of the thermal transfer fluid can be suppressed to a significant extent with an attendant advantage that the thermal conductivity can be enhanced owing to the degassing.

The thermal transfer fluid 3 comprises the following composition which are kneaded in a kneader for 20 to 30 minutes.

| Fixed carbon powder | 50 Kg |
|---|---|
| Water | 35 Kg |
| Glycerin | 2 Kg |
| Sodium chloride | 15 Kg |
| Sodium hypochlorite | 250 cc |
| Sodium dehydroacetate | 250 cc |

The thermal transfer fluid 3 should comprise fine particles of hard carbon or graphitic or fixed carbon dispersed in water. The fine particles of the carbon used in the present invention should preferably have a purity of 99.4% or over and a size of from 1 to 1000 micrometers. More preferably, the size is from 100 to 500 micrometers on average. The mixture should be fluid after mixing of the fine particles and water. Preferably, the mixing ratio between the fine particles and water is in the range of 75:25 to 60:40 on the weight basis, within which good fluidity and good thermal conductivity are ensured.

The fixed carbon particles may be obtained by molding a coke or pitch in the intended form and heating the resulting molded product to about 3000° C. The hard carbon is a so-called hard black.

Broadly, hard carbon includes both graphitic (or fixed) carbon and hard carbon, both of which are known to have very high thermal conductivity. This is considered owing to the existence of free electrons and the thermal conductivity is larger than those of metals. In general, heat passing through a solid matter is transported through carriers (electrons or holes) which take part in electric conduction and also by propagation of lattice vibrations. The thermal conductivity of hard or graphitic carbon is ascribed to the propagation of lattice vibrations which facilitates movement of the carriers.

According to the thawing device for frozen foods having the thermal transfer fluid comprising mainly the fine particles of the hard carbon or graphitic carbon, it has a high thermal conductivity so that it transmits its self heat or an ambient heat to the frozen foods for thereby thaw the frozen foods in a short time.

The formation of a hydrophilic surface which is wettable by water is attained, for example, by insolubilizing treatment of polyvinyl alcohol. More particularly, an aqueous solution of polyvinyl alcohol is applied and then treated with acetaldehyde for conversion into acetal product, followed by drying and sufficient washing with water. Alternatively, after coating with polyvinyl alcohol, the coating may be subjected to thermal treatment or polymerization under conditions of 120° C. and 2 hours, thereby forming the hydrophilic surface. Still alternatively, a copolymer of N-vinyl pyrrolidone and methyl methacrylate may be coated and dried to form such a surface.

In such a manner, if the surface of the thawing device is structured to be wettable, the boundary layer between the thawing plate and the frozen food to be thawed is formed of water film, which facilitates the thermal conductivity. If not structured as such, air is present in the boundary layer, which is not preferable in view of thermal conductivity and lowers the thawing efficiency.

The thawing device according to a first aspect of the present invention is deformed along the shape of the frozen foods and closely contact the frozen foods. The thawing device according to a second aspect of the present invention is liable to be wet at the surface thereof, hence if ice melts slightly, the adhesion to the thawing device by way of melted ice is enhanced. The thawing device according to the third aspect of the present invention can hold the frozen foods stably between the plate-shaped body and the bag-shaped body whereby the frozen foods can be covered entirely at the surfaces thereof by these bodies and the adhesion to the thawing device is particularly enhanced. Accordingly, the heat caused by thawing can be effectively transmitted to the frozen foods.

In addition, hard or graphitic carbon is able to generate far-infrared rays at normal temperatures. The far-infrared rays generated at normal temperatures have a wavelength of 5 to 15 micrometers. The far-infrared rays within the above-indicated range will cause a resonance phenomenon to occur in the frozen foods and will have the function of rendering the thawing time short, which is known empirically.

Glycerin is used as a surface active agent. Glycerin ensures good affinity between the ingredients of the thermal transfer fluid 3 and between the ingredients of the thermal transfer fluid 3 and the substrate of the bag-shaped body 1, for thereby preventing voids, which impedes the thermal conductivity, from being formed. A higher fatty acid non-ionic active agent is preferable to be employed as the surface active agent because it is excellent in emulsifying property, dispersibility and lubricity and is hygienic. Examples of the non-ionic surface active agent include polyethylene glycol and the like.

Likewise, in order to prevent water from becoming foul, sodium chloride and bactericides and/or preservatives may be added. Typical examples of the bactericide and preservative, respectively, include sodium hypochlorite and sodium dehydroacetate.

If a frozen beef having a weight of 150 g and a thickness of 15 to 30 mm is put in the bag-shaped thawing device Pa, it can be thawed within about 8 minutes so as to be chopped with a kitchen knife. A frozen salmon, chicken, prawn, etc. can be thawed within about 5 to 15 minutes. The speed for thawing the frozen food in the thawing device Pa is 5 to 10 times or more that left in the atmosphere. Furthermore, it is possible to maintain the quality of these frozen foods in the natural state without deteriorating freshness, quality and taste.

Various experimental data shows that the preferable range (w %) of the composition of the thermal transfer fluid 3 is as follows.

| Fixed carbon powder | 35 to 60 |
|---|---|
| Water | 20 to 50 |
| Surface active agent | 2 to 5 |
| Salt | 10 to 30 |
| Bactericide and | effective small amounts |

| -continued |
| --- |
| Preservative |

If the amount of the fine particles of the hard carbon powder are less than the above range namely, less than 35 to 60 (w %), an intended thermal conductivity can not be attained while if it is higher than 35 to 60 (w %), an intended fluidity can not be attained. The reverse is true of the case of water.

Figure 3:
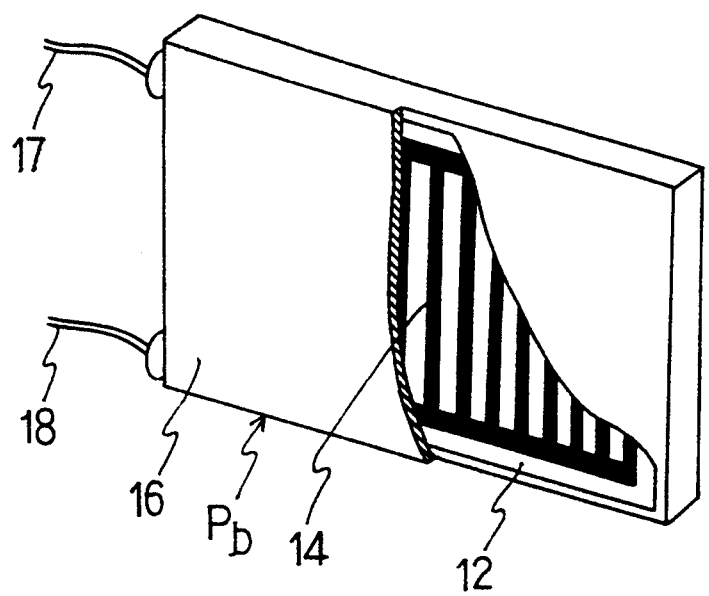
FIG. 3 is a perspective view of a thawing device according to a first modification of the second and third embodiments of the present invention.

First Modification (FIG. 3):

FIG. 3 is a perspective view of a plate-shaped thawing device Pb according to a first modification of the second and third embodiments of the present invention.

The thawing device Pb includes an insulating film 12 formed on the rear surface of the thawing device Pb, a heater 14 which has a semiconductor such as a carbon black printed thereon and is formed on the insulating film 12 and an insulating layer 16 formed on the heater 14 whereby an electric heat can be applied to the thawing device Pb through electrode codes 17 and 18.

Figure 4:
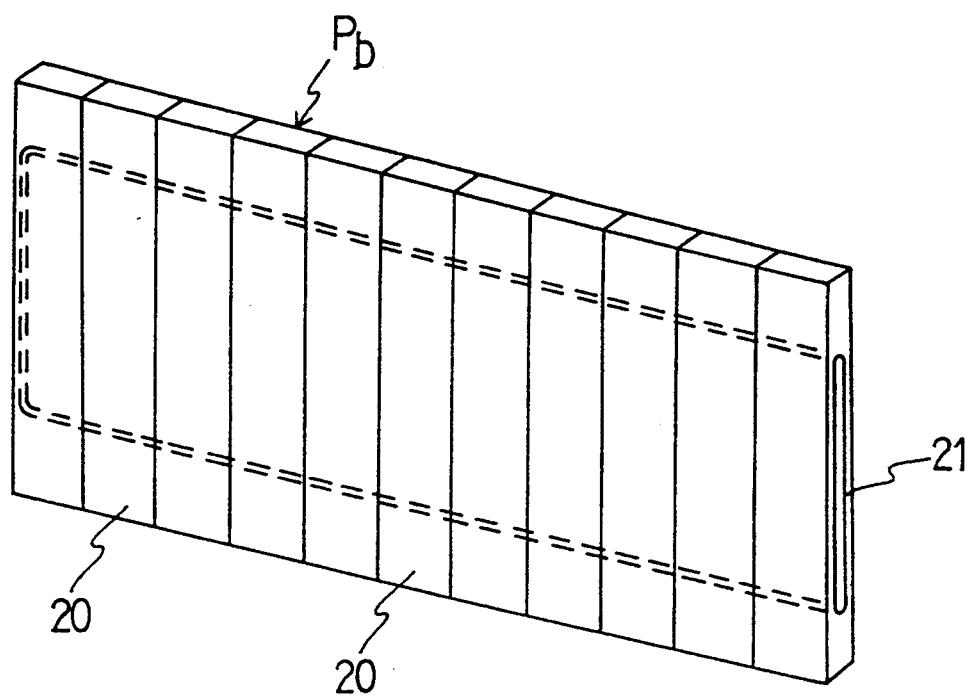
FIG. 4 is a perspective view of a thawing device according to a second modification of the second and third embodiments of the present invention.

First Modification (FIG. 4):

FIG. 4 is a perspective view of a thawing device Pb according to a second modification of the second and third embodiments of the present invention.

The thawing device Pb includes a plurality of strip thawing plates 20, 20, ... which are connected with one another by an elastic code 21 so that the thawing device Pb is liable to closely contact the frozen food and is deformable. Each of the thawing plates 20 has many perforations through which the elastic code 21 can insert.

Figure 5:
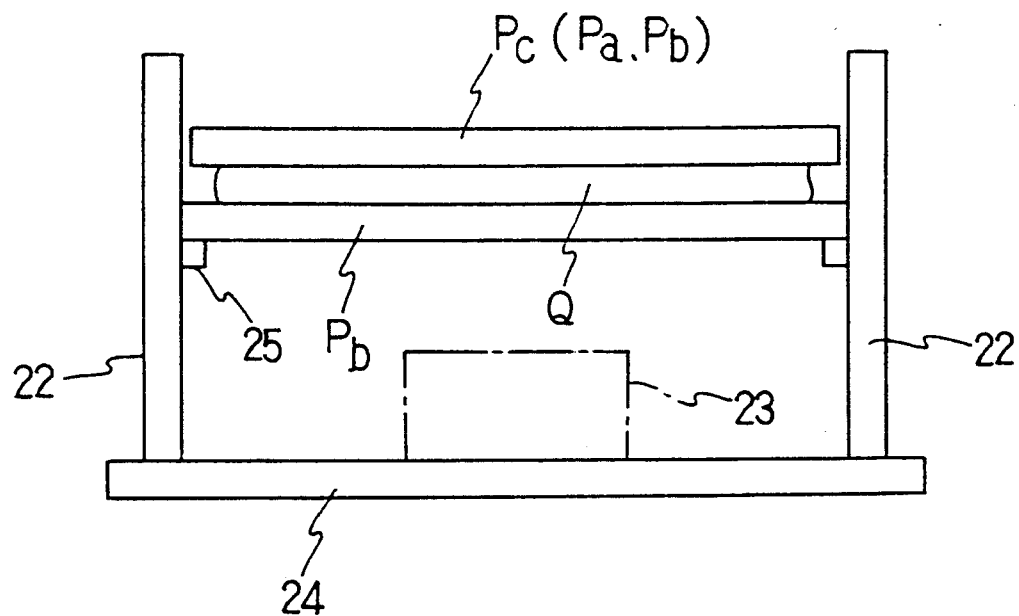
FIG. 5 is a front view of a thawing device according to a third modification of the first to third embodiments of the present invention.

Third Modification (FIG. 5):

FIG. 5 is a front view of a thawing device according to a third modification of the second and third embodiments of the present invention.

The thawing device comprises a substrate 24, supports 22 and 22 which extend vertically from both sides of the substrate 24 and the plate-shaped thawing device Pb which is supported by the supports 22 and 22 so as to perform heat exchange between the atmosphere and itself, suspension holders 25 for holding the plate-shaped thawing device Pb between the supports. A cover thawing device Pc may put on the frozen food Q whereby the frozen food Q can be held between the plate-shaped thawing device Pb and the cover thawing device Pc. A bag-shaped thawing device Pa or the plate-shaped thawing device Pb can be used as the cover thawing device Pc.

The cover thawing device Pc can be guided vertically along the supports 22 and 22 step by step or steplessly. A small fan 23 can be provided on the substrate 24 for blowing air toward the plate-shaped thawing device Pb whereby the heat-exchange between the frozen food Q and the thawing device Pb can be performed briskly.

The surface treatment of the plate-shaped thawing device Pb according to the third embodiment may not always be a wettable coated state. On the other hand, the surface treatment may be made by an antibacterial fluorocarbon resin coating including antibacterial, releasing, stain-resistant and lubricating and other properties, a so-called Teflon treatment. Even if in such treatment no problem occurs in the thawing efficiency, since the frozen foods to be thawed is held between the bag-shaped thawing device Pa and the plate-shaped thawing device according to the third embodiment like sandwiches. Furthermore, the thawing device is easy for maintenance thereof after the use thereof and excellent in hygienic points of view.

With the arrangements of the thawing device according to the first to third embodiments, there are following effects.

It is possible to thaw the frozen foods in a very short time compared with the conventional thawing device since the frozen foods are liable to closely contact the thawing device ingredients of which has excellent high thermal conductivity and are mainly composed of hard carbon or graphitic carbon.

Particularly, the thawing device of the first embodiment has a flexibility, namely, it is deformable, hence it can closely contact the frozen foods even if the latter have complicated shapes.

Furthermore, it is possible to enhance the thawing efficiently by double folding the thawing device to wrap the frozen foods.

The thawing device of the second embodiment has an excellent wettability, hence it can closely contact the frozen foods.

Since the boundary layer between the thawing plate and the frozen foods to be thawed is covered by water having an excellent thermal conductivity, it is possible to remarkably improve the thawing efficiency compared with the conventional arrangement having a boundary layer covered by air. Furthermore, since the stains are hardly to be attached to the surface and the stains attached to the surface can be easily removed, the maintenance of the thawing device after the use thereof is easy. Furthermore, it is possible to obtain the thawing device which is excellent in hygienic point of view by allowing the wettable coating to include functional materials which have antibacterial, releasing function. On the contrary, according to the conventional thawing device, since the surface is porous and uneven, the drip generated by the thawing immerses into the thawing device which causes smell and mold. However, this drawback has been solved by the second embodiment.

The thawing device of the third embodiment can puts the frozen foods on the plate-shaped thawing device with safety and wrap the frozen foods by the bag-shaped thawing device, hence it can thaw the frozen foods conveniently and very efficiently.

What is claimed is:

1. A thawing device for a frozen food item comprising a flexible bag-shaped body having a thermal transfer fluid hermetically sealed in the bag-shaped body wherein said thermal transfer fluid includes a mixture of fine particles of graphitic carbon and water; and a plate-shaped body composed of fine particles of graphitic carbon which is hardened by a binder and is subjected to heat treatment so as to be formed in a given plate-shape, a surface of the plate-shaped body exhibiting a hydrophilic property, whereby the food item rests on the surface of the plate-shaped body and the flexible bag-shaped body covers the food item and conforms to a shape and a size of the food item to facilitate rapid thawing of the food item.

2. The thawing device according to claim 1, wherein said fine particles of graphitic carbon have a size in the range of 1 to 1000 m.

3. The thawing device according to claim 2, wherein said fine particles of graphitic carbon have a size in the range of 100 to 500 m.

4. The thawing device according to claim 1, wherein the thermal transfer fluid has a mixing ratio by weight between said fine particles and water in the range of 75:25 to 60:40.

5. The thawing device according to claim 1, wherein said graphitic carbon particles comprise about 35 to 60% by weight of the thermal transfer fluid, and said water comprises about 20 to 50% by weight of the thermal transfer fluid.

6. The thawing device according to claim 1, wherein said thermal transfer fluid further comprises a surface active agent, a bactericide and a preservative.

7. The thawing device according to claim 6, wherein the surface active agent is polyethylene glycol.

8. The thawing device according to claim 6, wherein the bactericide is sodium hypochlorite.

9. The thawing device according to claim 6, wherein the preservative is sodium dehydroacetate.

10. The thawing device according to claim 1, wherein the surface of the plate-shaped body is formed by applying an aqueous solution of polyvinyl alcohol which is then subjected to polymerization.

11. The thawing device according to claim 1, wherein the surface of the plate-shaped body is formed by applying an aqueous solution of polyvinyl alcohol which is then treated with acetaldehyde for conversion into an acetal product followed by drying and sufficient washing with water.

12. The thawing device according to claim 1, wherein the surface of the plate-shaped body is formed by coating the plate-shaped body with a copolymer of N-vinyl pyrrolidone and methyl methacrylate.

13. The thawing device according to claim 1, wherein the surface of the plate-shaped body comprises an antibacterial fluorocarbon resin coating.

14. The thawing device according to claim 13, wherein the coating is Teflon.

* * * * *